United States Patent [19]

Blum

[11] Patent Number: 4,609,310

[45] Date of Patent: Sep. 2, 1986

[54] DRILLING MACHINE

[75] Inventor: Dietmar Blum, Höchst, Austria

[73] Assignee: Julius Blum Gesellschaft m.b.H., Höchst, Austria

[21] Appl. No.: 694,114

[22] Filed: Jan. 23, 1985

[30] Foreign Application Priority Data

Feb. 9, 1984 [AT] Austria ............................... 412/84
Aug. 27, 1984 [AT] Austria ............................. 2725/84

[51] Int. Cl.⁴ ............................................. B23B 39/20
[52] U.S. Cl. ......................................... 408/35; 408/53; 408/126; 408/136
[58] Field of Search ................ 408/35, 53, 126, 136

[56] References Cited

U.S. PATENT DOCUMENTS 1,104,517 7/1914 Landau ................................ 408/35

FOREIGN PATENT DOCUMENTS 47-23519 6/1972 Japan ................................... 408/35
258358 6/1949 Switzerland ........................ 408/35
687280 2/1953 United Kingdom ................. 408/35

*Primary Examiner*—Neil Abrams
*Attorney, Agent, or Firm*—Wenderoth, Lind & Ponack

[57] ABSTRACT

A drilling machine for use in industrial furniture production includes a drill spindle carrier which is rotatably mounted in a gear block. Two rows of drill spindles are staggered with respect to each other by 90°. Driving pinions of the drill spindles are arranged in recesses of a spacer disk of plastics material, such spacer disk spacing an upper and a lower cover plate of the drill spindle carrier.

7 Claims, 5 Drawing Figures

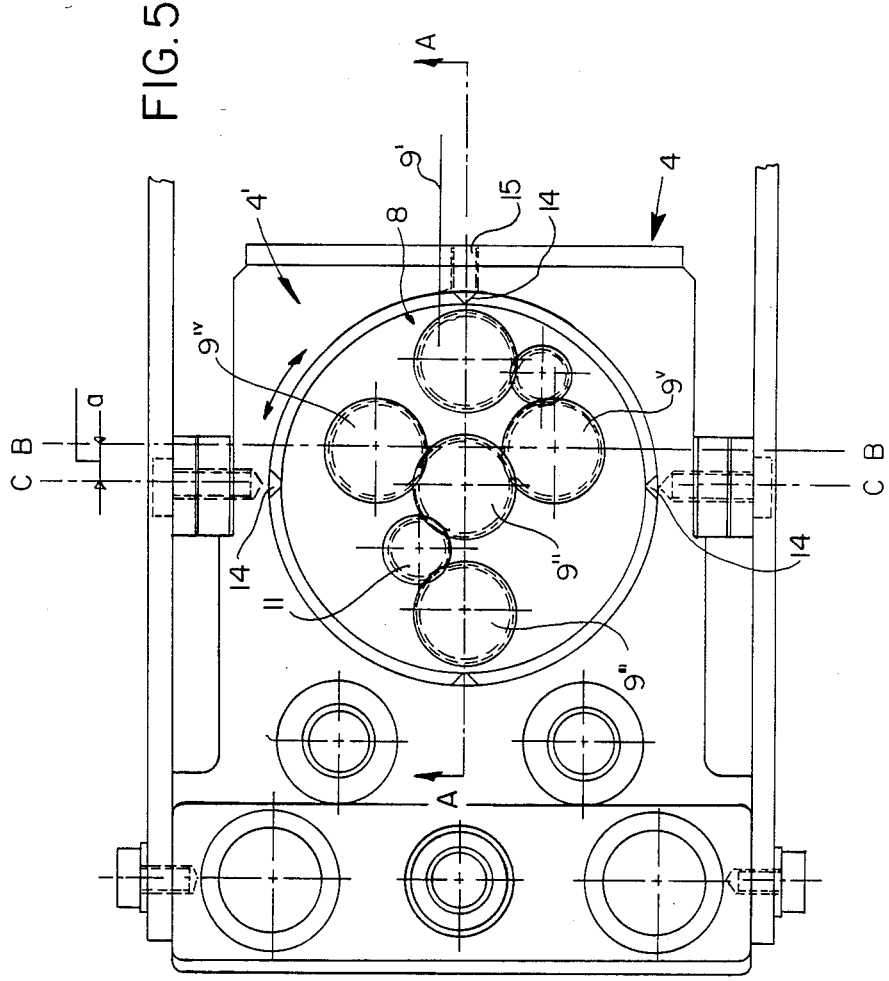

DRILLING MACHINE

FIELD AND BACKGROUND OF THE INVENTION

The invention relates to a drilling machine for use in furniture production for drilling bore holes into which dowels, hinge casings etc. may be inserted, the machine including a frame on which a driving motor and a gear block for a number of drill spindles are mounted, as well as thrust means, and a cylindrical drill spindle carrier which is rotatable about an axis extending parallel to the axes of the drill spindles and has a centric driving pinion being mounted in the gear block.

So-called automatic drilling machines are known for use in industrial furniture production and include drill beams carrying rows of drill bits by means of which drilling operations can be carried out at the sides and faces of plate-shaped furniture parts. The drill beams are partly pivotally mounted. In the drill rows, the drill kits are generally arranged at interspaces of 32 mm, the so-called system distance.

Furthermore, drilling machines are known which are particularly used for industrial furniture production and in which an electric motor provided with a drilling gear including a number of spindles is mounted in a carrier frame and adapted to be pressed to a position where drilling is to be carried out and to be lifted therefrom.

SUMMARY OF THE INVENTION

It is an object of the invention to provide a drilling machine which is particularly suited for the small furniture manufacturer or when small batches are produced.

The machine should carry out the drilling operations required for hinge casings and for mounting hinge arm plates, as well as drilling operations along the system row, as for example required for the insertion of furniture connectors and dowels. Fast and simple adaption of the device should be possible.

The gear of the drilling machine should further be characterized by quiet running and require less lubricating grease in comparison with conventional gears.

According to the invention this is achieved in that the drill spindle carrier is inserted into the gear block and secured by means of a Seeger ring, for example, and that the drill spindle carrier is at its outer surface provided with at least two, preferably four, catching locations or recesses which are staggered with respect to one another by 90° and in which engages a locking bolt or the like mounted in a stationary part of the gear block, thus to prevent rotation of the drill spindle carrier.

It is advantageously provided that the drill spindle carrier comprises upper and lower cover plates between which is arranged a spacer disk whose width corresponds to the height of the drill spindle carrier and whose diameter corresponds to the diameter of the drill spindle carrier. The disk further has at least one recess in which gear pinions are arranged, the contour of the recess at least partly corresponding to the contour of one or of a number of gear pinions.

The spacer disk is preferably of plastics material, whereas zinc is a suitable material for the cover plates. The contour of the recess is described by intersecting circles.

The set of cover plates and spacer disk is held together by threaded bolts.

An embodiment of the invention provides that a lever is secured to one cover plate or to the spacer disk by means of which the drill spindle carrier is rotatable about its longitudinal center axis in the gear block by 90°.

In this embodiment, three drill spindles, for example, may be arranged at interspaces of 32 mm along a diameter of the drill spindle carrier. By means of these drill bits, either bores for a mounting plate of a hinge arm or, when the drill spindle carrier is rotated by 90°, bore holes located along the edge of a plate-shaped furniture part in the usual system row, may be drilled.

By means of two drill spindles or drills which are spaced from another diameter of the drill spindle carrier and perpendicular to the first row of spindles, together with the center spindle of the first row, three bore holes can be drilled in one drilling operation for a hinge casing which has a cover flange and two dowels arranged in cantilever-like manner.

A hinge casing of the afore-mentioned kind is described in DE-OS No. 29 26 486.

BRIEF DESCRIPTION OF THE DRAWINGS

In the following an embodiment of the invention will be described with reference to the accompanying drawings in which:

FIG. 5 is a view analogous to FIG. 2, but of a further embodiment of the drill arrangement.

DESCRIPTION OF THE PREFERRED EMBODIMENTS

Figure 1:
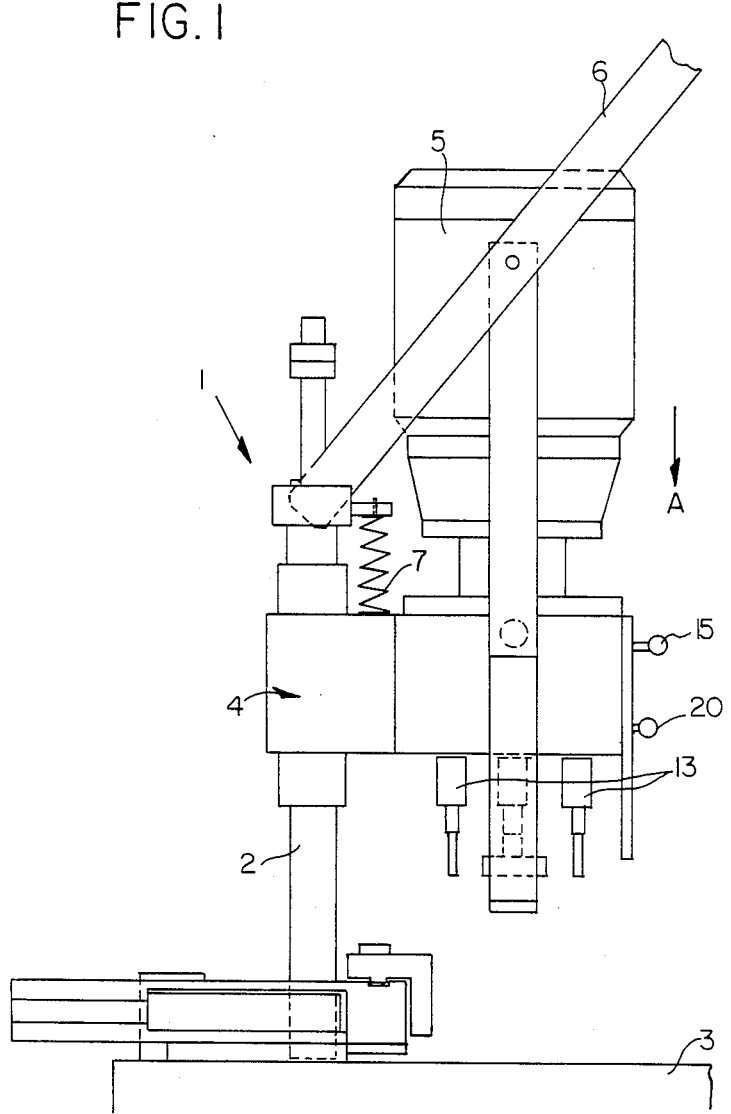
FIG. 1 is a side view of a drilling machine according to the invention.

The drilling machine according to the invention comprises a frame 1 with two guide columns 2, a work piece support 3, a gear block 4 and a driving motor 5.

The gear block 4 and the driving motor 5 are lowerable to the work piece support 3 by means of a lever 6 against the action of a tension spring 7.

A cylindrical drill spindle carrier 8 which is rotatable about its longitudinal center axis, i.e. about the vertical, is arranged in the gear block 4.

Drill spindles 9, which are provided with pinions and driven by the driving shaft of the driving motor 5, are arranged in the drill spindle carrier 8.

Drill bits are inserted into coupling members 13 of the drill spindles 9.

Figure 2:
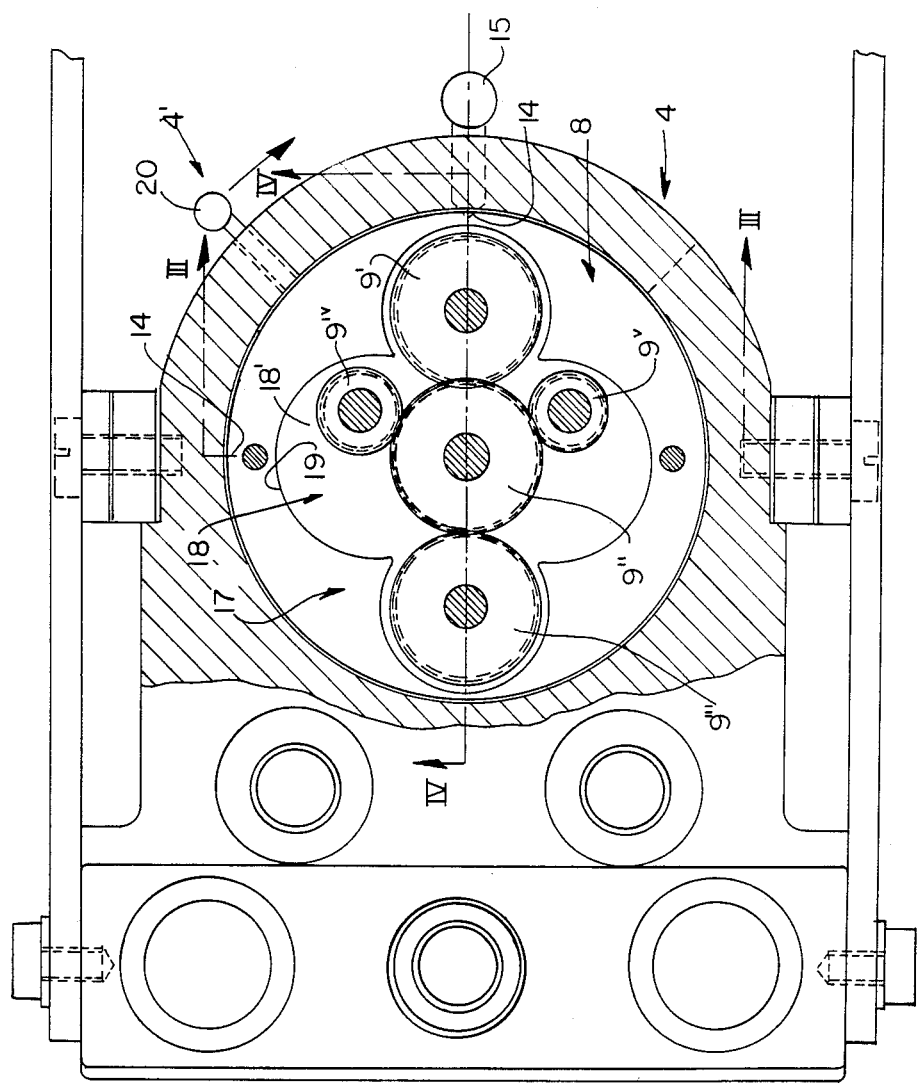
FIG. 2 is a top view, partially in section, of a gear block from the direction of arrow A of FIG. 1, the driving motor not being illustrated for the sake of clarity.

As can be seen from FIGS. 2 and 5, three drill spindles 9', 9'', 9''' lie in a plane A—A extending through the diameter of the drill spindle carrier 8, and two drill spindles $9^{IV}$, $9^V$ lie in a plane B—B which is perpendicular to plane A—A and spaced by a distance a from a plane C—C extending through the diameter of the drill spindle carrier 8 and perpendicular to plane A—A.

Instead of a conventional housing, the drill spindle carrier 8 comprises two cover plates 16 of zinc and a spacer disk 17 of plastics material arranged between the cover plates 16.

The spacker disk 17 is provided with an interior passage 18 through which the drill spindles 9 extend and in which are arranged pinions 11. The spacer disk 17 replaces a conventional gear housing.

In the illustrated arrangement, the interior passage 18 is formed by four partial recesses 18' having rims 19 defined by circular arcs of intersecting circles.

A lever 20 by means of which the drill spindle carrier 8 can be rotated by 90° is secured to the spacer disk 17 or to a cover plate 16.

Figure 3:
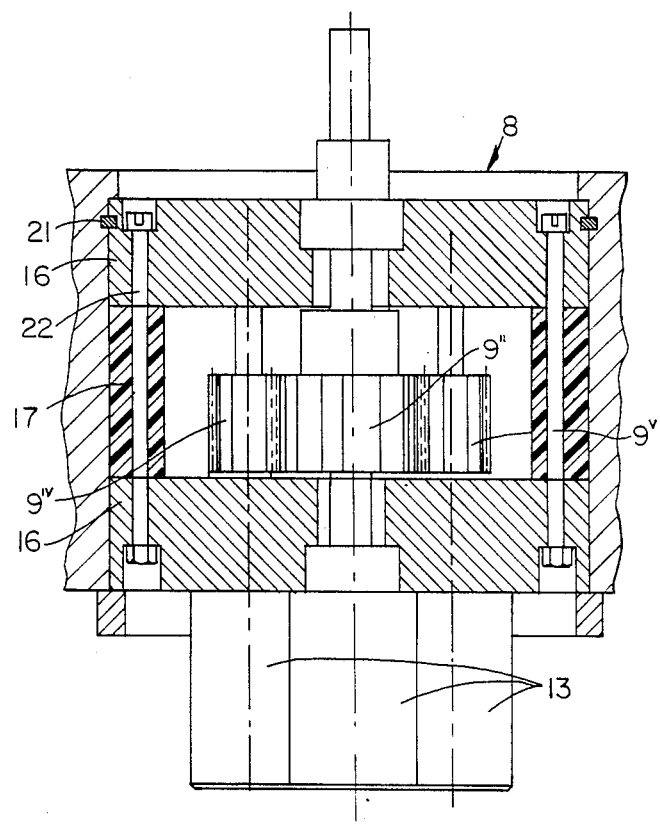
FIG. 3 is a sectional view along line III—III of FIG. 2.
Figure 4:
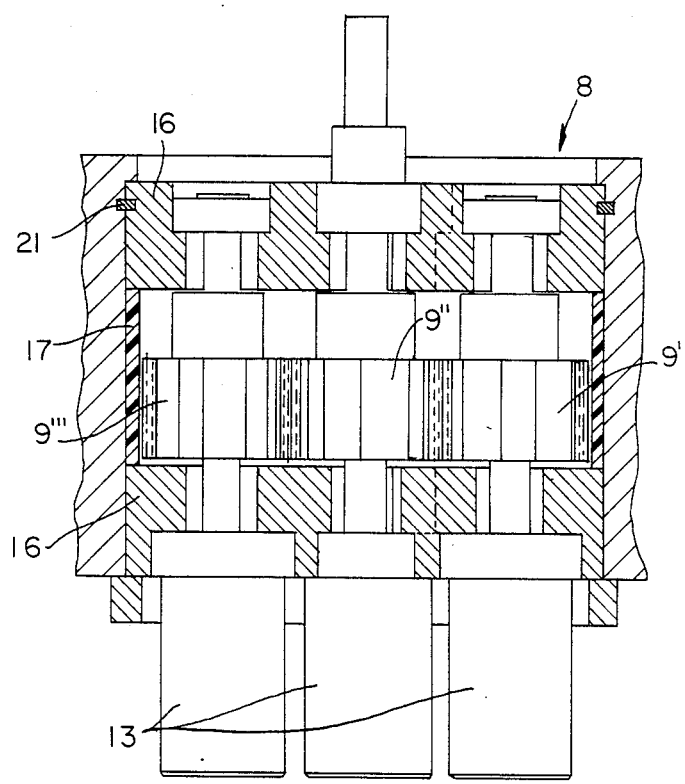
FIG. 4 is a sectional view along line IV—IV of FIG. 2.

The set of cover plates 16 and spacer disk 17 are held together by threaded bolts 22 (FIG. 3).

The outer surface of drill spindle carrier 8 is provided with two catching locations 14, e.g. recesses, into which a locking bolt 15 mounted in a stationary part 4' of the gear block 4 optionally may extend or engage. By means of the catching locations 14 and the locking bolts 15, the drill spindle carrier 8 can be precisely locked after 90° roation by means of the lever 20.

In the position of the drill spindle carrier 8 illustrated in FIG. 2, the bores for a hinge casing can be drilled by means of the drill spindles 9", $9^{IV}$ and $9^{V}$ and the associated drills, for example, and the bore holes for a hinge mounting plate can be drilled by means of the drill spindles 9', 9''' and the associated drills. When the drill spindle carrier 8 is rotated by 90°, the bore holes of a system row can be drilled by means of the drill bits which are coupled to the drill spindles 9', 9", 9'''.

In the embodiment according to FIG. 5, pinions 11 are arranged between the drill spindles 9', 9", 9''' and $9^{IV}$.

What is claimed is:

1. In a drilling machine for use in furniture production for drilling bore holes in a variety of furniture elements, said machine including a frame, a gear block mounted for reciprocating movement on said frame, a cylindrical drill spindle carrier mounted within said gear block and rotatable therein about a longitudinal center axis, a plurality of drill spindles mounted within said drill spindle carrier and having axes extending parallel to said center axis thereof, a driving motor mounted on said gear block for rotating one of said drill spindles, and pinions mounted on said drill spindles for transmitting rotation of said one drill spindle to the other said drill spindles, the improvement wherein:

said drill spindle carrier comprises upper and lower cover plates coupled to and spaced by a spacer disk;

said spacer disk has extending axially therethrough an interior passage defined by a plurality of connected axially extending recesses;

said drill spindles extend through said interior passage with each said recess having positioned therein one said drill spindle and the respective said pinion;

the contour of at least one said recess at least partially corresponding to the contour of the respective said pinion;

the diameter of said disk corresponds to the diameter of said drill spindle carrier; and latch means for locking said drill spindle carrier in at least two relative positions with respect to said gear block about said center axis.

2. The improvement claimed in claim 1, wherein said drill spindles include a first row of drill spindles extending in a first plane through a first diameter of said drill spindle carrier, and a second row of drill spindles extending in a second plane spaced from and parallel to a third plane through a second diameter of said drill spindle carrier and perpendicular to said first plane.

3. The improvement claimed in claim 1, wherein said spacer disk is formed of a plastic material.

4. The improvement claimed in claim 1, wherein the contour of said recesses are defined by intersecting circles.

5. The improvement claimed in claim 1, further comprising bolts extending through and coupling together said cover plates and said spacer disk.

6. The improvement claimed in claim 1, wherein said cover plates are formed of zinc.

7. The improvement claimed in claim 1, wherein said latch means comprise lock recesses formed in the outer surface of said drill spindle carrier at positions spaced circumferentially thereof, and a lock member mounted on said gear block for engagement in a selected said lock recess.

* * * * *